United States Patent
Pizza et al.

(10) Patent No.: US 11,049,153 B2
(45) Date of Patent: Jun. 29, 2021

(54) MAPPING AND FILTERING RECOMMENDATION ENGINE

(71) Applicant: salesforce.com, Inc., San Francisco, CA (US)

(72) Inventors: George Pizza, Cambridge, MA (US); Michael J. Torra, Cambridge, MA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/246,063

(22) Filed: Jan. 11, 2019

(65) Prior Publication Data

US 2020/0098020 A1 Mar. 26, 2020

Related U.S. Application Data

(60) Provisional application No. 62/735,624, filed on Sep. 24, 2018.

(51) Int. Cl.
*G06Q 30/02* (2012.01)
*G06N 5/04* (2006.01)
*H04L 29/08* (2006.01)
*G06F 16/9535* (2019.01)
*G06F 40/30* (2020.01)

(52) U.S. Cl.
CPC ..... *G06Q 30/0282* (2013.01); *G06F 16/9535* (2019.01); *G06F 40/30* (2020.01); *G06N 5/04* (2013.01); *H04L 67/22* (2013.01)

(58) Field of Classification Search
CPC . G06Q 30/0282; G06F 40/30; G06F 16/9535; H04L 67/22; G06N 5/04
See application file for complete search history.

(56) References Cited

U.S. PATENT DOCUMENTS

| | | | |
|---|---|---|---|
| 9,652,797 B2* | 5/2017 | Vijayaraghavan | ............................. G06Q 30/0201 |
| 2012/0143911 A1* | 6/2012 | Liebald | ................. G06F 3/0482 707/771 |
| 2015/0199743 A1* | 7/2015 | Pinel | .................. G06Q 30/0631 705/26.7 |
| 2017/0236131 A1* | 8/2017 | Nathenson | ......... G06Q 30/0201 705/26.7 |

* cited by examiner

*Primary Examiner* — Caroline H Jahnige
(74) *Attorney, Agent, or Firm* — Butzel Long; Butzel Long/salesforce; Donald J. Lecher

(57) ABSTRACT

A method of generating digital data content customized for a user of one or more digital data platforms includes determining, through artificial intelligence, interests of a first user of the one or more digital data platforms, as well as those of a plurality of other users. The method further includes generating a product recommendation for the first user by mapping and filtering, e.g., using ontological filtering, natural language processing and/or semantics, the interests determined for the plurality of other users to the interests determined for the first user, and transferring the product recommendation, along with inventory availability, to a client digital data device for presentation to the first user.

18 Claims, 2 Drawing Sheets

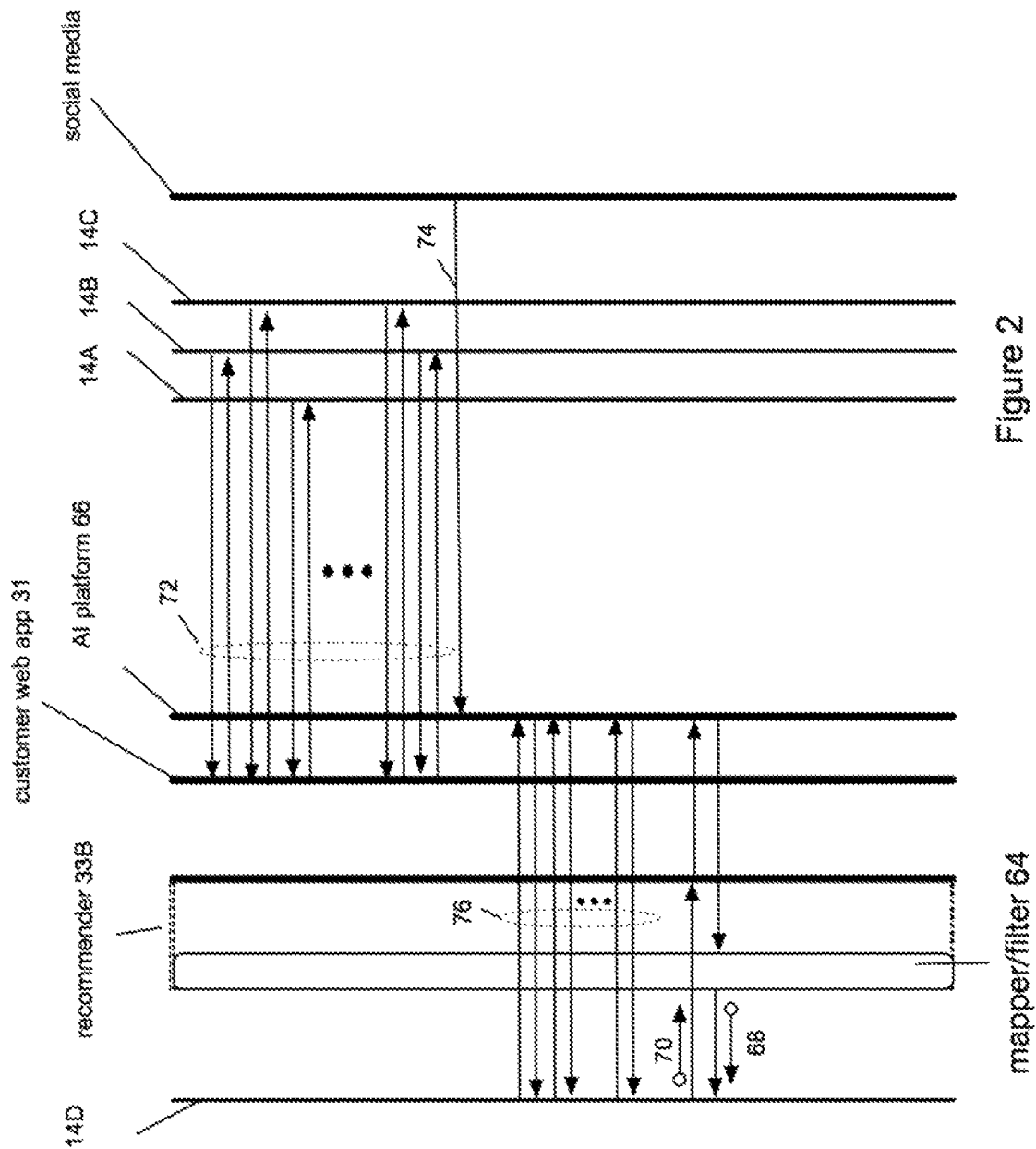

MAPPING AND FILTERING RECOMMENDATION ENGINE

This application claims the benefit of priority of U.S. Patent Application Ser. No. 62/735,624, filed Sep. 24, 2018, entitled Mapping and Filtering Recommendation Engine, the teachings of which are incorporated by reference herein.

BACKGROUND

This pertains to automatically generated digital content and, more particularly, to digital content generated through application of artificial intelligence. It has use, by way of non-limiting example, in the automatic generation of content for recommendations presented to users of e-commerce and other sites.

When it comes to buying on the internet, consumers have all the luck. Recommendation engines offer an embarrassment of riches when it comes to buying suggestions on business-to-consumer (B2C) sites. A typical visitor to such a site is presented with so many options that the issue is not so much what to buy, but how much.

Corporate purchasers are not so lucky. The business-to-business (B2B) web sites frequented by them often prove to be recommendation deserts, especially, when it comes to suggestions for stocking retail. With little to go on, the corporate buyer can only hope to have enough inventory to meet the next consumer surge.

The art proposes various solutions, but there is better to be had.

BRIEF DESCRIPTION OF THE DRAWINGS

A more complete understanding of the discussion that follows may be attained by reference to the drawings, in which:

FIG. 2 depicts an embodiment for an artificial intelligence recommendation generation with mapping and filtering.

DETAILED DESCRIPTION OF THE ILLUSTRATED EMBODIMENT

Figure 1:
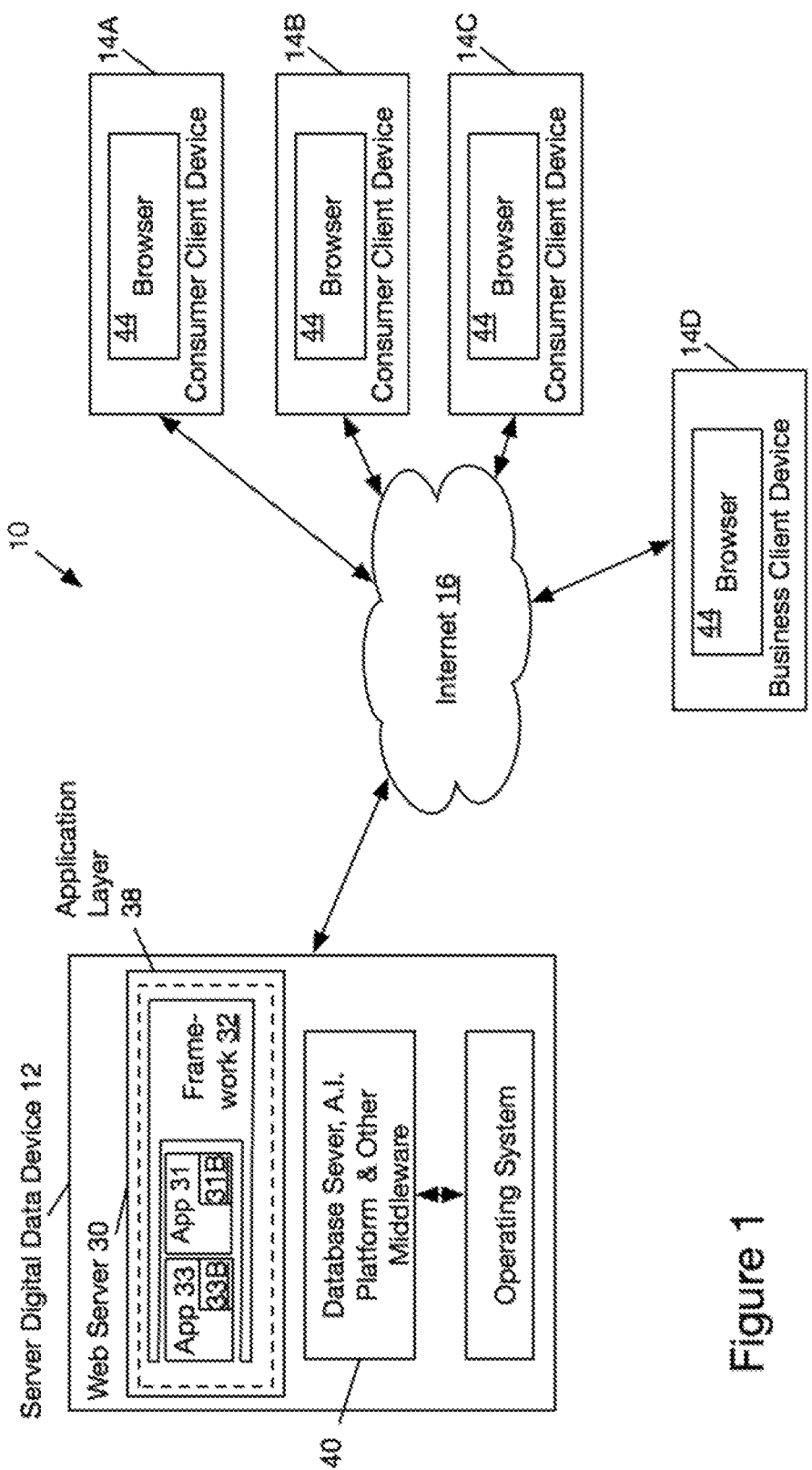
FIG. 1 depicts an environment in which an embodiment is employed.

FIG. 1 depicts a digital data processing system 10 that includes a server digital data device ("server") 12 coupled to client digital data devices ("clients") 14A-14D via a network 16. By way of non-limiting example, illustrated server 12 hosts an e-commerce portal or platform (collectively, "platform") of an online retailer, and clients 14A-14D are digital devices (e.g., smart phones, desktop computers, and so forth) of customers of that retailer and other users (collectively, "users") of that platform.

Devices 12, 14A-14D comprise conventional desktop computers, workstations, minicomputers, laptop computers, tablet computers, PDAs, mobile phones or other digital data devices of the type that are commercially available in the marketplace, all as adapted in accord with the teachings hereof. Thus, each comprises central processing, memory, and input/output subsections (not shown here) of the type known in the art and suitable for (i) executing software of the type described herein and/or known in the art (e.g., applications software, operating systems, and/or middleware, as applicable) as adapted in accord with the teachings hereof and (ii) communicating over network 16 to other devices 12, 14A-14D in the conventional manner known in the art as adapted in accord with the teachings hereof.

Examples of such software include web server 30 that executes on device 12 and that responds to requests in HTTP or other protocols from clients 14A-14D (at the behest of users thereof) for transferring web pages, downloads and other digital content to the requesting device over network 16 in the conventional manner known in the art as adapted in accord with the teachings hereof. Web server 30 includes web applications 31, 33 that include respective recommenders 31B, 33B, both of which may be part of broader functionality provided by the respective web applications 31, 33 such as, for example, serving up web sites or web services (collectively, "web sites") to client devices, all per convention in the art as adapted in accord with the teachings hereof. Such a web site, accessed by way of example by client devices 14A-14C and hosted by way of further example by web application 31, is an e-commerce site of a B2C retailer, e.g., for advertising and selling goods to its customers, per convention in the art as adapted in accord with the teachings hereof. Another such web site, accessed by way of example by client device 14D and hosted by way of further example by web application 33, is the e-commerce site of a B2B retailer, e.g., for use by business users, for example, in purchasing goods, e.g., to restock retail sites.

Recommenders 31B, 33B are server-side front-ends of an artificial intelligence-based platform 66 (FIG. 2) that includes a recommendation engine of the type that (i) generates digital content, particularly, recommendations, customized for presentation to users that visit the a respective one of the B2B and B2C web sites, e.g., via their respective client devices 14A-14D and browsers 44, and (ii) through those front-ends, transmits that content (i.e., those recommendations) to those client devices 14A-14C for presentation to the users thereof via their respective browsers, e.g., as part of web pages, downloads and other digital content per convention in the art as adapted in accord with the teachings hereof. In addition to facilitating transmitting the aforesaid content to the browsers 44 of client devices 14A-14D, the recommenders 31B, 33B facilitate monitoring behavior of the users of those browsers and otherwise obtaining user data (from the browsers, from user-account databases accessible by server 12, and otherwise) for processing by the platform 66. In an embodiment, such as that illustrated here, where server 12 hosts e-commerce web sites, the recommendations can be for goods or services (collectively, "goods" or "products") that may be of interest to the users of the respective client devices 14A-14D on the respective B2B and B2C web sites and/or related retail outlets, though, other embodiments may vary in this regard.

Recommendation engine is an artificial intelligence recommender system of the type commercially available in the marketplace that utilizes one or more of machine learning, deep learning, predictive analytics, natural language processing and smart data discovery to generate recommendations based on models learned and tuned from data regarding each user and his/her browsing, purchase and other behaviors (e.g., as discerned from the user's current activity on a browser, cookies on his/her client device 14A-14D, and store and other user accounts maintained on the or with the respective B2B and B2C web sites, and otherwise), as well as from other indicators of his/her interests (e.g., as reflected by postings on social networks and so forth), and from similar information from other users of like demographic or otherwise, all per convention in the art as adapted in accord with the teachings hereof.

Web framework 32 comprises conventional such software known in the art (as adapted in accord with the teachings hereof) providing libraries and other reusable services that are (or can be) employed—e.g., via an applications program interface (API) or otherwise—by multiple and/or a variety of web applications executing on the platform supported by server 12, two of which applications are shown here (to wit, web applications 31, 33).

In the illustrated embodiment, web server 30 and its constituent components, web applications 31, 33 and framework 32, execute within an application layer 38 of the server architecture. That layer 38, which provides services and supports communications protocols in the conventional manner known in the art as adapted in accord with the teachings hereof, can be distinct from other layers in the server architecture—layers that provide services and, more generally, resources (a/k/a "server resources") that are required by the web applications 31, 33 and/or framework 32 in order to process at least some of the requests received by server 30 from clients 14A-14D, and so forth, all per convention in the art as adapted in accord with the teachings hereof.

Those other layers include, for example, a data layer 40—which provides middleware, including the artificial intelligence platform 66 (FIG. 2), and which supports interaction with a database server 40, all in the conventional manner known in the art as adapted in accord with the teachings hereof and all by way of non-limiting example—and the server's operating system 42, which manages the server hardware and software resources and provides common services for software executing thereon in the conventional manner known in the art as adapted in accord with the teachings hereof. Other embodiments may utilize an architecture with a greater or lesser number of layers and/or with layers providing different respective functionalities than those illustrated here.

Though described here in the context of B2B and B2C web sites, in other embodiments web server 30 and applications 31, 33 and framework 32 may define web services or other functionality (e.g., available through an API or otherwise) suitable for responding to user requests, e.g., a video server, a music server, or otherwise. And, though shown and discussed here as comprising separate web applications 31, 33 and framework 32, in other embodiments, the web server 30 may combine the functionalities of those components or distribute them among still more components.

Moreover, although the B2C and B2B web sites are shown, here, as hosted by different respective web applications 31, 33, in other embodiments those web sites may be hosted by a single such application or, conversely, by more than two such applications. And, by way of further example, although web applications 31, 33 are shown in the drawing as residing on a single common platform 12 in the illustrated embodiment, in other embodiments they may reside on different respective platforms and/or their functionality by be divided among two or more platforms. Likewise, although artificial intelligence platform 66 is described here as forming part of the middleware of a single platform 12, it other embodiments the functionality ascribed to element 66 may be distributed over multiple platforms or other devices.

With continued reference to FIG. 1, client devices 14A-14D of the illustrated embodiment execute web browsers 44 that (typically) operate under user control to generate requests in HTTP or other protocols, e.g., to access web sites on the aforementioned platform, to search for goods available on, through or in connection with that platform (e.g., goods available from a web site retailer—whether online and/or through its brick-and-mortar outlets), to advance-order or request the purchase (or other acquisition) of those goods, and so forth, and to transmit those requests to web server 30 over network 14—all in the conventional manner known in the art as adapted in accord with the teachings hereof. Though referred to here as web browsers, in other embodiments applications 44 may comprise web apps or other functionality suitable for transmitting requests to a server 30 and/or presenting content received therefrom in response to those requests, e.g., a video player application, a music player application or otherwise.

The devices 12, 14A-14D of the illustrated embodiment may be of the same type, though, more typically, they constitute a mix of devices of differing types. And, although only a single server digital data device 12 is depicted and described here, it will be appreciated that other embodiments may utilize a greater number of these devices, homogeneous, heterogeneous or otherwise, networked or otherwise, to perform the functions ascribed hereto to web server 30 and/or digital data processor 12. Likewise, although four client devices 14A-14D are shown, it will be appreciated that other embodiments may utilize a greater or lesser number of those devices, homogeneous, heterogeneous or otherwise, running applications (e.g., 44) that are, themselves, as noted above, homogeneous, heterogeneous or otherwise. Moreover, one or more of devices 12, 14A-14D may be configured as and/or to provide a database system (including, for example, a multi-tenant database system) or other system or environment; and, although shown here in a client-server architecture, the devices 12, 14A-14D may be arranged to interrelate in a peer-to-peer, client-server or other protocol consistent with the teachings hereof.

Network 16 is a distributed network comprising one or more networks suitable for supporting communications between server 12 and client device 14A-14C. The network comprises one or more arrangements of the type known in the art, e.g., local area networks (LANs), wide area networks (WANs), metropolitan area networks (MANs), and or Internet(s). Although a client-server architecture is shown in the drawing, the teachings hereof are applicable to digital data devices coupled for communications in other network architectures.

As those skilled in the art will appreciate, the "software" referred to herein—including, by way of non-limiting example, web server 30 and its constituent components, web applications 31, 33 and web application framework 32, browsers 44—comprise computer programs (i.e., sets of computer instructions) stored on transitory and non-transitory machine-readable media of the type known in the art as adapted in accord with the teachings hereof, which computer programs cause the respective digital data devices, e.g., 12, 14A-14D to perform the respective operations and functions attributed thereto herein. Such machine-readable media can include, by way of non-limiting example, hard drives, solid state drives, and so forth, coupled to the respective digital data devices 12, 14A-14D in the conventional manner known in the art as adapted in accord with the teachings hereof.

Described below in connection with FIG. 2 is operation of the web applications 31, 33 in connection with AI platform 66, as well as with other components of the illustrated system 10, to generate and transfer AI recommendations 68 to the user of the B2B web site (via device 14D). This can be in response to a request 70 for such a recommendation generated by the web browser 44 of device 14D and, more particularly, by way of non-limiting example, in response to a request for such a recommendation generated by a "recommender" widget or other code executing in a web page or other content downloaded by and presented on that browser 44, or otherwise, as per convention in the art as adapted in accord with the teachings hereof.

Platform 66 monitors, continually or otherwise, web pages, files and other content downloaded to browsers 44 of the clients 14A-14C of the B2C web site, as well as the responses of the respective users of those clients 14A-14C to those downloads and/or their other interactions with the web site (and, more generally, server 12). From those interactions, denoted in the drawing as communications 72, the platform utilizes artificial intelligence to discern the B2C users' collective interests in current and future products, all in the conventional manner known in the art as adapted in accord with the teachings hereof. The platform 66 can make further such inferences regarding the product interests those users by monitoring social media feeds 74, whether targeted to that population of users as a whole, a subset of that population and/or to specific B2C individuals (here, for example, the users of devices 14A-14C), again, all per convention in the art as adapted in accord with the teachings hereof. Further evidence of the B2C users' product interests is provided by account databases and other information (not shown) maintained by or accessible to platform 66, which requests and obtains that information per convention in the art as adapted in accord with the teachings hereof. Those skilled in the art will appreciate that platform 66 can perform the aforesaid monitoring through utilization of its role in the middleware of server 12, through the front-end 31B and/or otherwise as per convention in the art as adapted in accord with the teachings hereof.

Platform 66 discerns the product-related interests and/or behavior of the user of the B2B website, i.e., the user of device 14D, in a manner similar to that described above. Here, too, the platform 66 monitors, continually or otherwise, web pages, files and other content downloaded to browser 44 of the client 14D, as well as the responses of the user of that client 14D to those downloads and/or his/her other interactions with the B2B web site (and, more generally, server 12). As above, from those interactions, denoted in the drawing as communications 76, the platform utilizes artificial intelligence to discern the B2B user's product-related interests and/or product-related behavior, all in the conventional manner known in the art as adapted in accord with the teachings hereof. The platform 66 can make further such inferences by monitoring social media feeds 74, targeting postings and other communications to/from that B2B user, again, per convention in the art as adapted in accord with the teachings hereof. And, too, further evidence of the B2B user's behavior is provided by account databases and other information (not shown) maintained by or accessible to platform 66, which requests and obtains that information per convention in the art as adapted in accord with the teachings hereof. Again, those skilled in the art will appreciate that platform 66 can perform the aforesaid monitoring through utilization of its role in the middleware of server 12, through the front-end 33B and/or otherwise as per convention in the art as adapted in accord with the teachings hereof.

In order to generate the recommendation 68, e.g., in response to request 70, the front-end 33B of platform 66 maps products in which it has discerned the B2C users have interest to those to which it has discerned the B2B user's interests and/or behaviors are directed, filtering out those to for which the respective interests do not align. In the illustrated embodiment, such mapping and filtering is performed by mapping/filtering module 64 that forms part of and/or is invocable by the recommender 33B. Thus, by way of non-limiting example, if the platform 66 discerns from monitoring the B2C users' activities that they are searching for, purchasing and/or posting to social media about fidget spinners, 4K televisions and Crocs® and the platform likewise discerns that the B2B user is or has utilized the B2B web site to acquire footwear in bulk, its front-end recommender 33B can generate and transmit to device a recommendation (suitably encoded in HTML or otherwise) to the effect that foam clog shoes are trending among consumers, all in the conventional manner known in the art as adapted in accord with teachings hereof. The recommender 33B avoids generating such a recommendation in regard to the B2C user's interests in fidget spinners and televisions, because they fall outside the B2B user's apparent interests (to wit, in footwear).

In circumstances where the B2B and B2C web sites served by apps 31 and 33 draw from a common product catalog, e.g., as where those web sites are hosted by a common or vertically-integrated retailer, the recommender 33B can perform such mapping and filtering by comparing catalog identifiers associated with products in which the B2C users have expressed interest against those for which the B2B user is or has made purchase orders, filtering out those for which the B2B user has shown no interest (and therefore, likely, no purchase authority). In circumstances, however, where no such direct mapping is to be had (e.g., as where the B2B and B2C web sites are partially or wholly unrelated), the recommender 33B can utilize ontological filtering, natural language processing, semantics and other techniques known in the art to map products in which the B2C and B2B users, respectively, have a common apparent interest, while filtering out those in which they do not. Such mapping and filtering, whether catalog entry-based or otherwise, is within the ken of those skilled in the art in view of the teachings hereof.

Described above and shown in the drawings are apparatus, systems and method for artificial intelligence engine recommendations. It will be appreciated that the embodiments shown here are merely examples and that others fall within the scope of the claims set forth below. Thus, by way of example, although the discussion above focusses on product recommendations, it will be appreciated that this applies equally to the recommendation of other items and things.

In view of the foregoing, what is claimed is:

1. A computer-implemented method of generating digital data content customized for a user of one or more of a plurality of digital data platforms, comprising:

determining, via a web application processing device using an artificial intelligence-based platform including a Business-to-Business (B2B) website and a Business-to-Consumer (B2C) website, first product-related purchase activity for a product category of a first user of one or more of the plurality of digital data platforms based on monitoring first user browser behavior data of the first user at the business-to-business website, the first user browser behavior data including first user restocking activity of retail goods within the product category, social media feeds, targeting postings and communications both to and from the first user;

determining, via the web application processing device using the artificial intelligence-based platform including the B2B website and the B2C website, second product-related interests of a plurality of other users of one or more of the plurality of digital data platforms based on monitoring the plurality of other users browser behavior data of the plurality of other users of the B2C website including at least one of searching activity, purchasing activity and social media posting activity regarding at least one retail product;

generating a product recommendation specifying a product type within the determined product category for the first user by mapping and filtering the determined first product-related purchase activity of the product category of the first user against the determined second product-related interests of the plurality of other users; and transferring the product recommendation specifying the product type to a client digital data device for presentation to the first user.

2. The computer-implemented method of claim 1, further including monitoring communications between one or more of the plurality of digital data platforms and the client digital data device of the first user, where the monitored communications include at least one of web pages, files and other content downloaded to the client digital data device and further include responses from the client digital data device to the at least one of web pages, files and other content.

3. The computer-implemented method of claim 1, further including monitoring communications between one or more of the plurality of digital data platforms and respective client digital data devices of the plurality of other users, where the monitored communications include at least one of web pages, files and other content downloaded to the client digital data device and further include responses from the client digital data device to the at least one of web pages, files and other content.

4. The computer-implemented method of claim 3, further including inferring interests of the plurality of other users by monitoring any of (i) interactions between one or more of the plurality of digital data platforms and the respective client digital data devices of the plurality of other users, and (ii) social media feeds.

5. The computer-implemented method of claim 1, wherein the mapping and filtering step including using one or more of an ontological filter, natural language processing, and semantics to map and filter the second interests determined for the plurality of other users to the first interests determined for the first user.

6. The computer-implemented method of claim 1, wherein the first user being a user of a first web site or web service executing on the one or more platforms, and the plurality of other users being users of one or more other web sites or web services executing on the one or more platforms.

7. The computer-implemented method of claim 6, wherein the first web site being a business-to-business web site or web service, and the one or more other web sites or web services being business-to-consumer web sites or web services executing on the one or more platforms.

8. A non-transitory machine readable storage medium having stored thereon a computer program configured to cause one or more digital data devices to perform the steps of:

determining, via a web application processing device using an artificial intelligence-based platform including a Business-to-Business (B2B) website and a Business-to-Consumer (B2C) website, first product-related purchase activity for a product category of a first user of one or more of a plurality of digital data platforms, based on monitoring first user browser behavior data of the first user at the business-to-business website, the first user browser behavior data including first user restocking activity of retail goods within the product category, social media feeds, targeting postings and communications both to and from the first user;

determining, via the web application processing device using the artificial intelligence-based platform including the B2B website and the B2C website, second product-related interests of a plurality of other users of one or more of the plurality of digital data platforms based on monitoring the plurality of other users browser behavior data of the plurality of other users of the B2C website including at least one of searching activity, purchasing activity and social media posting activity regarding at least one retail product;

generating a product recommendation specifying a product type within the determined product category for the first user by mapping and filtering the determined first product-related purchase activity of the product category of the first user against the determined second product-related interests of the plurality of other users;

transferring the product recommendation specifying the product type to a client digital data device for presentation to the first user.

9. The non-transitory machine-readable storage medium of claim 8, further configured to cause the one or more digital data devices to perform the steps including monitoring communications between one or more of the plurality of digital data platforms and the client digital data device of the first user, where the monitored communications include at least one of web pages, files and other content downloaded to the client digital data device and further include responses from the client digital data device to the at least one of web pages, files and other content.

10. The non-transitory machine-readable storage medium of claim 8 configured to cause the one or more digital data devices to perform the steps including monitoring communications between one or more of the plurality of digital data platforms and respective client digital data devices of the plurality of other users, where the monitored communications include at least one of web pages, files and other content downloaded to the client digital data device and further include responses from the client digital data device to the at least one of web pages, files and other content.

11. The non-transitory machine-readable storage medium of claim 10 configured to cause the one or more digital data devices to perform the steps including inferring interests of the plurality of other users by monitoring any of (i) interactions between one or more of the plurality of digital data platforms and the respective client digital data devices of the plurality of other users, and (ii) social media feeds.

12. The non-transitory machine-readable storage medium of claim 8 configured to cause the one or more digital data devices to perform the steps including using one or more of an ontological filter and natural language processing to map and filter the second interests determined for the plurality of other users to the first interests determined for the first user.

13. The non-transitory machine-readable storage medium of claim 8, the first user being a user of a first web site or web service executing on the one or more platforms, and the plurality of other users being users of one or more other web sites or web services executing on the one or more platforms.

14. A system comprising:
one or more digital data devices; and
computer instructions configured to cause the one or more digital data devices to perform:
determining, via a web application processing device using an artificial intelligence-based platform including a Business-to-Business (B2B) website and a Business-to-Consumer (B2C) website, first product-related purchase activity for a product category of a first user of one or more of a plurality of digital data platforms based on monitoring first user browser behavior data of the first user at the business-to-business website, the first user browser behavior data including first user restocking activity of retail goods within the product category, social media feeds, targeting postings and communications both to and from the first user;

determining, via the web application processing device using the artificial intelligence-based platform including the B2B website and the B2C website, second product-related interests of a plurality of other users of one or more of the plurality of digital data platforms based on monitoring the plurality of other users browser behavior data of the plurality of other users of the B2C website including at least one of searching activity, purchasing activity and social media posting activity regarding at least one retail product;

generating a product recommendation specifying a product type within the determined product category for the first user by mapping and filtering the determined first product-related purchase activity of the product category of the first user against the determined second product-related interests of the plurality of other users; and transferring the product recommendation specifying the product type to a client digital data device for presentation to the first user.

15. The system of claim 14, wherein the computer instructions are further configured to cause the one or more digital data devices to perform monitoring communications between one or more of the plurality of digital data platforms and the client digital data device of the first user, where the monitored communications include at least one of web pages, files and other content downloaded to the client digital data device and further include responses from the client digital data device to the at least one of web pages, files and other content.

16. The system of claim 14, wherein the computer instructions are further configured to cause the one or more digital data devices to perform monitoring communications between one or more of the plurality of digital data platforms and respective client digital data devices of the plurality of other users, where the monitored communications include at least one of web pages, files and other content downloaded to the client digital data device and further include responses from the client digital data device to the at least one of web pages, files and other content.

17. The system of claim 14, wherein the computer instructions are further configured to cause the one or more digital data devices to perform inferring interests of the plurality of other users by monitoring any of (i) interactions between one or more of the plurality of digital data platforms and the respective client digital data devices of the plurality of other users, (ii) social media feeds.

18. The system of claim 14, wherein the computer instructions are further configured to cause the one or more digital data devices to perform using one or more of an ontological filter and natural language processing to map and filter the second interests determined for the plurality of other users to the first interests determined for the first user.

\* \* \* \* \*